United States Patent Office

2,961,461
ESTERS OF HEXAHYDROBENZILIC ACID

Roelof Feike Rekker, Amsterdam, Netherlands, assignor to N.V. Koninklijke Pharmaceutische Fabrieken v/h Brocades Stheeman & Pharmacia, Amsterdam, Netherlands, a Dutch limited-liability company No Drawing. Filed Jan. 14, 1957, Ser. No. 633,816
Claims priority, application Netherlands Jan. 17, 1956
6 Claims. (Cl. 260—473)

As is known, papaverine has been used as a spasmolytic for a considerable time. Besides this compound, a number of esters containing basic nitrogen in the alcohol radical have been investigated for the same purpose; for a survey of this matter, see the paper by Blicke in Ann. Rev. of Biochem. 13, 549–574 (1944); a basic ester of $\alpha$-phenyl-$\alpha$-cyclohexylglycolic acid with spasmolytic properties is also found described in Helv. Chim. Acta 30, 292–295 (1947).

Since these esters, owing to the presence of the said basic group, are rather toxic, attempts have been made to find other compounds which exhibit greater spasmolytic activity, but less toxicity. Examples of such compounds are a number of esters of mandelic acid, of carboxylic acids with an aliphatically bound carboxyl group, which carry either a non-substituted aryl radical or a heterocyclic radical and a hydroxyl or oxo group, or more than one non-substituted aryl radical and a hydroxyl or oxo group or not, including benzilic acid. One of the best-known of these esters is the 3,3,5-trimethylcyclohexanol ester of mandelic acid.

Now it has been found that esters of hexahydrobenzilic acid ($\alpha$-phenyl-$\alpha$-cyclohexylglycolic acid) and primary saturated aliphatic alcohols, with three to six carbon atoms in the molecule, have a strikingly high spasmolytic activity. These esters are new substances.

Examples of suitable alcohols are: propanol-1, butanol-1, 2-methylpropanol-1, pentanol-1, 2-methylbutanol-1, 3-methyl-butanol-1, hexanol-1, 2-ethylbutanol-1.

The toxicity of these alcohols is very low. Thus the $LD_{50}$ for mice upon oral administration is no more than 10 g./kg. mice for all these esters.

Several examples of esters from the new group are mentioned in the following list; behind their names, their boiling points and their activities are stated. The activity was tested for the living intestine of cavia against acetylcholine (A.C.) according to the method of Magnus, for which the activity of the 3,3,5-trimethylcyclohexanol ester of mandelic acid was put 100. The esters with the greatest activity are preferred.

In this table has also been included—on the same basis—a comparison with the corresponding esters of mandelic and benzilic acids.

TABLE

| Alcohol component | Boiling point ester in °C. | Activity | | |
|---|---|---|---|---|
| | | esters of mandelic acid | esters of benzilic acid | esters of hexahydrobenzilic acid |
| | | A.C. | A.C. | A.C. |
| Propanol-1 | 140/2 mm | 3.5 | 230 | 2,200 |
| Butanol-1 | 148/2 mm | 11 | 1,150 | 31,000 |
| 2-Methylpropanol-1 | 144/2 mm | 11 | 1,200 | 22,000 |
| Pentanol-1 | 158/2 mm | 35 | 1,600 | 36,500 |
| 3-Methylbutanol-1 | 154/2 mm | 35 | 1,650 | 18,500 |
| Hexanol-1 | 152/0.01 mm | 41 | ¹ n.d. | 2,500 |
| 2-Ethylbutanol-1 | 147/0.01 mm | 50 | ¹ n.d. | 13,000 |

¹ n.d.=not determined.

For the application of these esters, preparations are made from them with the aid of a carrier suitable for therapeutic uses. This carrier is chosen in accordance with the object for which the preparation is intended. Thus, the mixtures can be made up into cachets or tablets, which, if desired, can also be candied. If the ester is liquid at room temperature or if it melts at a low temperature, the ester is caused to be adsorbed by substances such as oxidized starch, bolus alba, colloidal silicic acid or the like, e.g. in a quantity of 10 mg. of the active substance to 200 mg. of adsorbing agent. The mixture thus obtained can be introduced into cachets. If the adsorbing agent lends itself to this, tablets can also be made of the mixture; if not, fillers that can be made into tablets, such as talcum, lactose or saccharose, have to be added. If the ester is solid at ordinary temperature, it can be mixed at once with a therapeutically suitable carrier and introduced into cachets, or it can be mixed with carriers that can be made up into tablets and thus tableted. In case the ester is volatile, the tablets can be sealed by a coating. If the tablets are to be sucked, these tablets are made as small as possible, while water-soluble fillers are preferred.

For oral administration the starting material may be a solution, suspension or emulsion of an ester, e.g. in a fatty oil, such as arachis oil, upon which the solution, suspension or emulsion is enclosed in capsules. The esters can also be administered in the form of a draught, for which water serves as carrier. Since most esters are relatively poorly soluble in water, the best method is to make a suspension or emulsion of the esters in water, which is then preferably stabilized with gummy substances.

For parenteral, subcutaneous, intramuscular or intravenous administration a liquid can be taken as carrier. For the solvent, use can be made e.g. of propylene glycol, glycerol, glyceryl diethyl ether, *solutio Petit ad injectionem* C.M.N.II (a mixture of alcohol, glycerol, and water).

Solvents of the above-mentioned type are chosen because the solubility of the esters in water as a rule is rather poor. It is, however, also possible to make aqueous injection liquids by the addition of compounds enhancing the solubility of the esters in water, such as urethan, substituted amides, methyl glucamine, polyvinyl pyrrolidone.

For the solvent, use can also be made of oils, such as arachis oil, with which oil a wax can be admixed with a view to the formation of a supply.

The esters can also be very finely divided in water, with addition of e.g. a substance which reduces the surface tension of water, as a result of which a very fine emulsion or suspension is formed, which is suitable for injections.

The solutions, emulsions or suspensions can be sterilized and the mixtures put in a sterile manner in ampoules. It is also possible to put the solution, emulsion or suspension in the ampoules and subsequently to sterilize the latter along with their contents.

The esters can also be administered locally, viz. in the form of ointments or creams; here again the carrier should be chosen in accordance with the object in view. Thus, ointments and creams will be made on the basis of a fat or an emulsion; the latter may be of the water-in-oil or the oil-in-water type. Local administration can also take place in the form of erosol, in which case the solution or suspension is atomized.

The ointments can also be prepared on a non-fatty basis; to this end the esters are dissolved e.g. in propylene glycol and polyethylene glycol waxes. The esters can further be introduced into a solution, emulsion or suspension, and then be atomized as erosol.

If the esters are dissolved in a mass, such as cocoa butter, they can be moulded or compressed in the form of suppositories.

The new esters can be prepared by the method commonly used for esters in organic chemistry, e.g. by direct esterification or by conversion of a salt of hexahydrobenzilic acid with a hydrogen halogen ester of the alcohol.

Hexahydrobenzilic acid can, for example, be prepared in the following manner (see also J. Am. Chem. Soc. 71, 3772 (1949)).

1. Preparation of cyclohexyl chloride

A mixture of 1000 g. (10 moles) of cyclohexanol, 2500 ml. of concentrated HCl (specific gravity 1.19), and 800 g. of $CaCl_2$ (granular) is boiled under reflux on a boiling water bath for 15–24 hours, with stirring, in a three-necked flask. The oil layer formed is separated off and dried with a large quantity of $CaCl_2$ by shaking the mixture for about 10 hours on the shaking machine. The dry liquid is finally distilled. Yield 1015 g. (85.6%); a colourless liquid with B.P. 141° C./760 mm.

2. Cyclohexylmagnesium chloride

Into a three-necked flask equipped with a stirrer and a reflux condenser is introduced 86.4 g. (3.6 moles) of magnesium turnings, which are covered with 200 ml. of anhydrous ether, upon which a few iodine crystals and 15 ml. of cyclohexyl chloride are added. When the reaction has started, the remainder of the calculated quantity of chloride, i.e. 383 g. of cyclohexyl chloride dissolved in 800 ml. of anhydrous ether, is added dropwise, with stirring. After completion of the reaction the mixture is boiled under reflux with stirring for another hour.

3. Phenylglyoxylic acid ethyl ester

A mixture of 356 g. (2.37 moles) of crude phenylglyoxylic acid, 410 ml. (7.11 moles) of absolute ethanol, 700 ml. of $C_2H_4Cl_2$, and 36 ml. of concentrated $H_2SO_4$ is boiled under reflux for 20–24 hours. The reaction product is transferred to a flask containing 5 litres of water, as a result of which the sulphuric acid and the excess of ethanol dissolve in the water. After addition of about 100 ml. of $CCl_4$ the oil layer is separated and washed, once with $NaHCO_3$ solution and once with water. After drying with $Na_2SO_4$ the washed solution is distilled. Yield 337 g. (80%, calculated on crude phenylglyoxylic acid). B.P. 80° C./0.1 mm.

4. Hexahydrobenzilic acid

The cooled and freshly prepared Grignard compound sub 2 is added dropwise, with stirring, to 337 g. (1.9 moles) of phenylglyoxylic acid ethyl ester dissolved in 600 ml. of anhydrous ether. After completion of the reaction the mixture is boiled under reflux for another hour, upon which it is decanted into a flask containing 1 kg. of ice and 100 ml. of concentrated $H_2SO_4$.

The oil layer is separated off and the aqueous layer is shaken with twice 100 ml. of ether. The ethereal extracts are washed once with a $NaHCO_3$ solution and once with water, dried over $Na_2SO_4$, and distilled. Yield 272 g. (55%, calculated on phenylglyoxylic acid ethyl ester). B.P. 135° C./3 mm.

From the ester thus obtained, the hexahydrobenzilic acid can be liberated by saponification. This acid can then be converted into the corresponding ester with the desired alcohol, e.g. by taking 0.09 mole of alcohol, 40 ml. of $C_2H_4Cl_2$, and 1.5–2 ml. of $H_2SO_4$ (concentrated) to every 0.03 mole of acid and boiling the mixture under reflux for 15–24 hours. The reaction product is subsequently purified in the known manner.

According to these directions all the suitable esters of hexahydrobenzilic acid can be prepared, so that it is superfluous to give examples of this.

A few examples may here be given of the processing of the new esters to preparations suitable for therapeutic uses:

1. Tablets

A mixture is made of the following components: 10 mg. of the 2-methylpropanol-1 ester is adsorbed on a mixture of 140 mg. of lactose and 120 mg. of oxidized starch; then 10 mg. of talcum and 10 mg. of magnesium stearate are added.

From this mixture, tablets of 300 mg. are made.

If desired, these tablets may be provided with a tablet varnish and a coating, as a result of which dragées are obtained.

2. Capsules

A solution of 10 mg. of the pentanol-1 ester of hexahydrobenzilic acid in 250 mg. of arachis oil is introduced into 0.3-cc. capsules, after which the capsules are sealed.

3. Ampoules

A solution containing 10 mg. of methyl-2-propanol-1 ester of hexahydrobenzilic acid to every cc. of propylene glycol-1,2 is introduced into 1-cc. ampoules. The contents of the ampoules is subsequently sterilized for ½ hour in a current steam.

What I claim is:

1. Esters of hexahydrobenzilic acid and primary saturated aliphatic alcohols with three to six carbon atoms.
2. The ester of hexahydrobenzilic acid and butanol-1.
3. The ester of hexahydrobenzilic acid and 2-methylpropanol-1.
4. The ester of hexahydrobenzilic acid and pentanol-1.
5. The ester of hexahydrobenzilic acid and 3-methylbutanol-1.
6. The ester of hexahydrobenzilic acid and 2-ethylbutanol-1.

References Cited in the file of this patent

UNITED STATES PATENTS

| | | |
|---|---|---|
| 2,707,194 | Nauta | Apr. 26, 1955 |
| 2,757,177 | Krapcho | July 31, 1956 |

FOREIGN PATENTS

| | | |
|---|---|---|
| 509,016 | Canada | Jan. 11, 1955 |

OTHER REFERENCES

Coan et al.: J. Am. Chem. Soc., 78, 3701–3 (1956).